United States Patent [19]
VanWinckel

[11] Patent Number: 5,618,582
[45] Date of Patent: Apr. 8, 1997

[54] COATING COMPOSITION AND METHODS OF USE

[76] Inventor: Walter VanWinckel, 46 Triton Point, Littleton, N.C. 27850-9565

[21] Appl. No.: 485,235

[22] Filed: Jun. 7, 1995

Related U.S. Application Data

[62] Division of Ser. No. 254,136, Jun. 6, 1994, which is a continuation of Ser. No. 7,664, Jan. 22, 1993, abandoned, which is a continuation of PCT WO 92/02,307, filed Jul. 23, 1991, which is a continuation-in-part of Ser. No. 557,104, Jul. 25, 1990, abandoned.

[51] Int. Cl.$^6$ .............................. B05D 1/32; B05D 7/24
[52] U.S. Cl. ...................... 427/259; 427/271; 427/407.2; 427/408
[58] Field of Search .................................. 427/154, 155, 427/259, 269, 271, 407.2, 408, 282

[56] References Cited

U.S. PATENT DOCUMENTS

| | | | |
|---|---|---|---|
| 1,256,818 | 2/1918 | Nile | 206/454 |
| 3,549,448 | 12/1970 | Dearing | 427/154 |
| 3,904,117 | 9/1975 | Adams, Jr. | 239/146 |
| 5,020,288 | 6/1991 | Swensen | 52/202 |
| 5,107,643 | 4/1992 | Swensen | 52/202 |
| 5,242,712 | 9/1993 | Miller | 427/282 |
| 5,441,769 | 8/1995 | Ross | 427/282 |

FOREIGN PATENT DOCUMENTS

| | | |
|---|---|---|
| 2-48079 | 2/1990 | Japan. |
| 2146267 | 4/1985 | United Kingdom. |

OTHER PUBLICATIONS

Spraylat Advertisement and Data Sheet for Glass Strip, Mar. 1990, 2 pages.
Wagner Instructions for Glass Mask ™, 1984, 1 page.

Primary Examiner—Shrive Beck
Assistant Examiner—Fred J. Parker
Attorney, Agent, or Firm—Parsons & Goltry; Robert A. Parsons; Michael W. Goltry

[57] ABSTRACT

A cohesive coating composition (16) having differential adhesion properties is applied to window glass (12) without regard to covering adjacent trim material (14) which is to be subsequently painted. The DAC (differential adhesion composition) coating (16) is characterized by high adhesion to wood, metal, plastics and painted surfaces and at the same time by selective adhesion to glass-like surfaces, so that the coating composition (16) may be easily scraped, peeled, or otherwise lifted from the glass (12), together with any paint overlay thereon, after the painting operation of the window frame (14) is completed. When subjected to sheer forces of pulling and scraping, the cohesive properties of DAC coating (16) when considered in combination with a relatively low adhesion to glass, allows the coating (16) to be removed in long continuous strips rather than fracturing into small pieces. Indicia can also be applied to the DAC coating (16) once DAC coating (16) is applied to the glass (12) as a protective coating. Also, the DAC coating (16) can be used directly as a paint so that any paint (18) inadvertently applied to glass (12) or glass-like surfaces during a painting operation can be subsequently lifted off the glass (12).

10 Claims, 2 Drawing Sheets

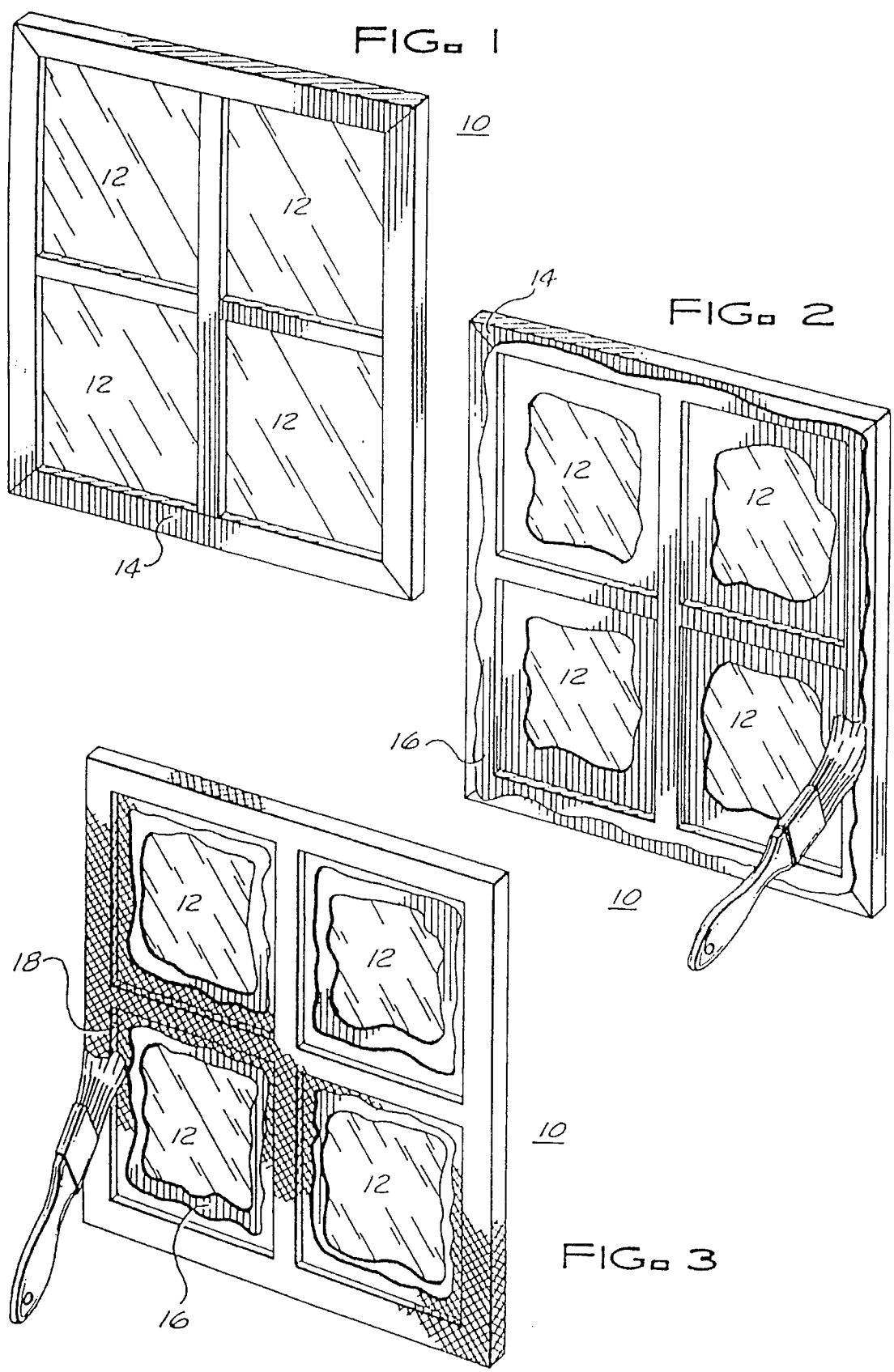

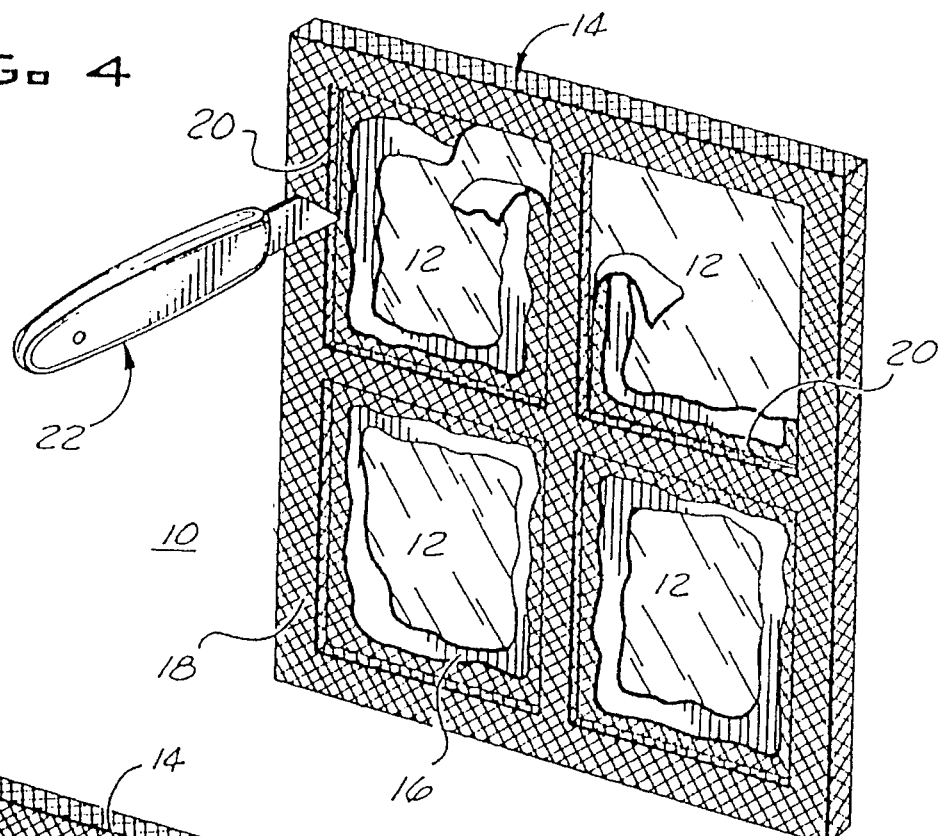
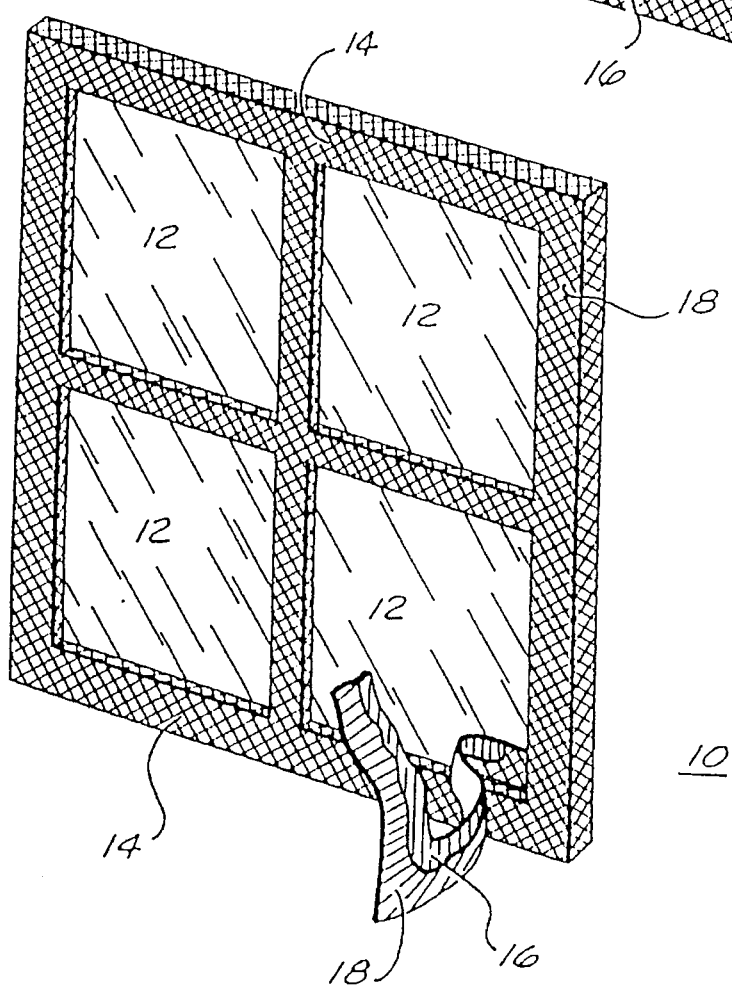

COATING COMPOSITION AND METHODS OF USE

This application is a division of Ser. No. 08/254,136 filed Jun. 6, 1994, which is a continuation of Ser. No. 08/007,664 filed Jan. 22, 1993, now abandoned, which is a continuation of PCT WO 92/02,307 filed Jul. 23, 1991 which is a continuation-in-part of Ser. No. 07/557,104 filed Jul. 25, 1990, now abandoned.

TECHNICAL FIELD

The present invention relates generally to coatings used to protect glass and glass-like surfaces from paint or similar treatments. More specifically, the present invention relates to a cohesive coating having a high adhesion to non-glass surfaces and a low adhesion to glass-like surfaces so that once dry, the coating may be pulled off the glass in a continuous strip.

BACKGROUND ART

When painting window frame and trim materials there is always the attendant problem of keeping the paint off the glass, while at the same time in order to protect the frame or trim from moisture, sealing the juncture between the trim and the glass with paint. Normally, the paint is applied in a narrow band on the glass surface adjacent the trim, but this method can be difficult and time-consuming, requiring an inordinate painting skill. Another less exacting method involves painting along the trim-glass junction, sometimes onto the glass, sometimes shy of the glass. While this method may be faster than the previous method, it leaves the trim-glass juncture in an unsealed state. In such cases rain water or indoor condensation will seep into the unprotected interface and eventually cause destruction of the trim materials by rotting or cracking. Also the old paint at the interface will be dried and cracked, thus allowing moisture to seep in at the interface and eventually lift the putty away from the glass to enhance further water penetration.

Still other methods include painting at will on the glass surface or window pane while painting the trim. A scraper or razor blade must then be used to remove the paint. Ordinary latex paint can be scraped off within hours after being applied, but after that short period it will adhere to the glass strongly. When dry, ordinary paint is not a particularly "cohesive" coating and, as such, will then break up, or fracture, when subjected to the sheer forces of the scraper. When paint dries too thoroughly, it must be removed in small pieces, a time-consuming task which often damages the glass.

Yet another method involves masking. With masking, an adhesive coating or tape is placed on the window pane, prior to installation or after installation, so that the trim or frame material can be painted quickly and without regard to the juncture between glass and trim since any excess paint will be applied to the protective coating. This method, however, again requires the time-consuming operation of carefully applying the adhesive coating so that it lines up with and abuts the glass-trim juncture.

To summarize the drawbacks of the above-mentioned methods for protecting window pane glass during a trim or frame painting operation, it will be seen that a high labor commitment is required, involving increased expense, or in the absence of skilled labor, sloppy work in the form of uneven edges of paint residue along the trim-glass interface or juncture, especially after spray painting (and including concrete splatter on the window glass during new construction), or in the case of applying a protective coating for the glass, the time consuming step of applying masking tape or other protective adhesive coating to square up exactly with the glass-trim interface, in which case paint can be drawn under the edge of the tape or coating at the interface by capillary action.

DISCLOSURE OF INVENTION

Accordingly it is an object of the present invention to provide an improved masking composition.

Another object of the present invention is to provide a masking composition that can be applied using conventional paint application techniques.

Another object of the present invention is to provide a cohesive protective coating which may be applied to glass and non-glass surfaces such as window panes and trim prior to painting, and after painting will adhere to the trim but will lift easily off the glass leaving the glass paint free.

Another object of the present invention is to provide a protective coating which is easily and quickly applied to window trim and the adjacent window pane before painting and easily removed from the glass after painting.

Yet another object of the present invention is to provide a protective coating which is highly cohesive in that it does not break up, or fracture, when subjected to the sheer forces of pulling or scraping the coating off glass-like surfaces.

Another object of the present invention is to provide a protective coating which when applied to window trim and adjacent window panes remains supple and easily removable from the glass for a sufficient amount of time after application to allow for delays in applying paint or other treatments to the window trim.

Yet another object of the present invention is to provide a protective coating which, when applied to non-glass surfaces, may be painted with most paints, including both alkyd and latex paints and will adhere strongly to the non-glass surface.

Another object of the present invention is to provide a protective coating which, when applied to window trim and adjacent window panes, will seal the trim-glass juncture.

Another object of the present invention is to provide a protective coating which can be applied efficiently by relatively unskilled laborers and still produce professional-looking results when painting non-glass surfaces adjacent to glass surfaces.

Yet another object of the present invention is to provide a protective coating which can be applied to glass and can be used to display indicia such as the glass manufacturer's logo, installation instructions, and the like.

Yet another object of the present invention is to provide a protective coating which may itself be used as a paint on any material adjacent to a glass-like surface.

Yet another object of the present invention is to provide an improved method for applying paint to non-glass materials adjacent glass-like surfaces.

Another object of the present invention is to provide a protective coating which has application to a DAC (differential adhesion composition) coating product and may be used to coat any dissimilar and juxtaposed surfaces where one is a surface to be treated such as a non-glass surface whether painted or not, and the other is a glass-like or glazed ceramic surface.

The above and other advantages of the present invention are carried out in one form by a coating composition comprising a resin emulsion having low adhesion to glass-like surfaces and high adhesion to non-glass materials.

The above and other advantages of the present invention are carried out in another form by a method for painting a non-glass material adjacent a glass-like surface with a coating composition having selective adhesion to glass-like surfaces and high adhesion to the non-glass material. The method calls for painting the non-glass material with the coating composition without regard for painting the glass-like surface at the same time. Later, the method calls for lifting the coating composition from the glass-like surface adjacent the non-glass material. The coating composition may itself be a paint, a primer, or a clear coating.

BRIEF DESCRIPTION OF DRAWINGS

A more complete understanding of the present invention may be derived by referring to the detailed description and claims when considered in connection with the FIGURES, wherein like reference numbers refer to similar items throughout the FIGURES, and:

FIG. 1 shows a front view of a window with trim;

FIG. 2 shows the window after the a differential adhesive composition (DAC) coating has been applied to the trim and surrounding area;.

FIG. 3 shows the window after the trim and underlying DAC coating have been painted;

FIG. 4 illustrates the use of a scribe or razor blade to mark a tear line for use in lifting the DAC coating off the glass; and FIG. 5 shows the painted trim, clean glass, and removal of the last continuous strip of the DAC coating.

BEST MODE FOR CARRYING OUT THE INVENTION

Following is a first example of the coating composition exhibiting differential adhesion properties:

| Example 1 | |
|---|---|
| Materials | Parts by weight |
| Acrylic Emulsion (Rohm & Haas ML-200) | 77.1 |
| Defoamer (Ross Foamblast 384E) | 0.1 |
| Preservative (Busan 1024) | 0.1 |
| Stabilizer and wet-edge agent | |
| (propylene glycol) | 2.8 |
| (glycerol) | 0.8 |
| Coalescent (Tennessee Eastman Texanol) | 2.2 |
| Cellulose Thickener (Hercules HBR 1.5%) | 16.1 |
| Associative Thickener | 0.8 |
| (Rohm & Haas Acrysol RM-825 25%) | |

Following are further examples of the differential adhesive composition (DAC) coating according to the invention:

| Materials | Parts by weight |
|---|---|
| Example 2 | |
| Acrylic Emulsion (Rohm & Haas AC707) | 107.0 |
| Associative Thickener (Rohm & Haas RM1020) | 3.5 |
| Preservative (Cosan Chemical 234) | 0.4 |
| Coalescent (Tennessee Eastman Texanol) | 3.4 |
| UV Absorber (Ciba-Geigy Tinuvin 1130) | 1.0 |
| Stabilizer (propylene glycol) | 3.0 |
| Antifoam (Dow Corning H-10) | 0.3 |
| Associative Thickener (Rohm & Haas TT165) | 1.0 |
| Water | 10.0 |
| Example 3 | |
| Acrylic emulsion/resin emulsion (Rohm & Haas AC707/AC235 1:1 wt.) | 428.0 |
| Associative Thickener (Union Carbide SCT 270 10%) | 7.0 |
| Preservative (Cosan Chemical 234) | 1.6 |
| Coalescent (Tennessee Eastman Texanol) | 7.1 |
| UV Absorber (Ciba-Geigy Tinuvin 1130) | 2.9 |
| Ph Adjustment (NH OH) | 10.0 |
| Stabilizer (propylene glycol) | 4.0 |
| Stabilizer (ethylene glycol) | 4.0 |
| Defoamer (Daniel Products DF8815) | 1.0 |
| Associative Thickener (Rohm & Haas RM1020) | 14.0 |
| Example 4 | |
| Resin Emulsion (Rohm & Haas AC235) | 107.0 |
| Associative Thickener (Rohm & Haas RM1020) | 1.0 |
| Associative Thickener (Rohm & Haas RM825) | 2.0 |
| Preservative (Cosan Chemical 234) | 0.4 |
| Coalescent (Tennessee Eastman Texanol) | 2.4 |
| UV Absorber (Ciba-Geigy Tinuvin 1130) | 1.0 |
| Ph Adjustment (NH OH) | 4.0 |
| Stabilizer (propylene glycol) | 3.5 |

In each of the above-listed examples, the composition of the coating according to the invention is environmentally acceptable. A less expensive version of the formulation can be created by increasing the amount of water in the formulation. In that case more thickener may be needed. This inexpensive formulation will take more time to dry. Also, a less expensive resin may be used.

Some of the resin families that may be used with the composition of the present invention; namely, acrylic resins, polyvinyl acetates., and alkyd resins. Some acrylic emulsion vehicles for the DAC (differential adhesion composition) coating according to the invention are sufficient of themselves to act as differential adhesive coatings exhibiting the properties of having low adhesion to glass and high adhesion to wood, baked enamels and painted surfaces, and certain metals and plastics.

For the purpose of this invention, namely to provide a protective coating for window glass during a painting operation performed on the trim adjacent the glass, the effectiveness of the acrylic emulsion is enhanced by the addition of the above-described materials. For example, the thickener agent improves the strength of the coating. The coalescing agent serves to bind the resin particles or ingredients of the composition, that is, binds or "glues" the microscopic resin particles together as the coating dries. The preservative serves to preserve the composition from decay in the container and as a film when applied. The wet-edge agent, the glycol and glycerol component, not only enhances uniform application of the coating composition when it is applied to the work surface but it also helps ease the liftability of the coating under varying conditions of temperature and humidity. Glycerol and various glycols serve as hygroscopic agents. In the preferred embodiment, around 1–4 parts of coalescing agent and around 1–4 parts of wet-edge agent are utilized for each 100 parts of resin emulsion.

The capacity of hygroscopic agents to absorb and retain moisture or water is believed to be have a significant influence over the differential adhesion effect. It is believed that some resin emulsions as supplied by the manufacturer have sufficient differential adhesion characteristics to work as a differential adhesion composition alone. The differential adhesion effect appears to come in part from the retention of higher-than-normal levels of moisture in the coating over relatively long periods. A loss of moisture in the coating results in a reduction in liftability. However, by the use of a very powerful hygroscopic agent, the water can be retained in the DAC coating even during the most adverse ambient conditions. The same effect may be produced to a lesser extent by using larger quantities of less hygroscopic additives. In the preferred embodiment of the present invention, the differential adhesion characteristics of the DAC coating persist for longer than one day and preferably at least 30 to 60 days after application. This length of time allow for ordinary, and even extraordinary, delays in completing a painting job.

The DAC coating can be made as shown in Examples 2 and 3 by the use of propylene glycol and/or ethylene glycol. These hygroscopic agents are formulated into ordinary paint for other reasons than achieving the differential adhesion characteristics of the present invention and at much higher percentages than in the differential adhesion coating formulations. Yet ordinary paint can only be scraped with relative ease during a very short time after application, generally less than 24 hours, depending on the specific formulation of the paint and the ambient temperature, humidity, and other factors. It is believed that this difference between the DAC coating of the present invention and ordinary paint may be caused by the pigment in the paint. The pigments may tend to absorb the ethylene glycol, propylene glycol, and other hygroscopic agents, reducing their effectiveness. Regardless, conventional paints are unsuitable as differential adhesion coatings.

The suggested hygroscopic agents are the glycols, glycerol, and Carbitol solvent, and hygroscopic agents as shown in Table 1. However, any hygroscopic agent is a candidate. Glycerol is the preferred candidate since it absorbs and retains a very high percentage of moisture for an extended period of time, as shown in Table 2.

TABLE 1

Hygroscopic Agents
Only a few chemical categories account for the major hygroscopic agents. These are:

| | |
|---|---|
| (1) | Quaternary ammonium compounds, |
| (2) | Amine derivatives, |
| (3) | Phosphate esters, |
| (4) | Derivatives of polyhydric alcohols, such as |
| | (a) Sorbitol, and |
| | (b) Glycerine, |
| (5) | Polyglycol esters of fatty acids, and |
| (6) | Glycols, such as - |
| | (a) Ethylene glycol, |
| | (b) Diethylene glycol, |
| | (c) Triethylene glycol, |
| | (d) Propylene glycol, |
| | (e) Dipropylene glycol, and |
| | (f) Tripropylene glycol. |

TABLE 2

Hygroscopicity of 99.5%-purity Glycerine at 50% Relative Humidity

| | Percentage Weight Increase | |
|---|---|---|
| Hour | @ 70° F. (21° C.) | @ 77° F. (25° C.) |
| 10 | 5 | 4 |
| 20 | 7 | 5 |
| 30 | 8 | 7 |

TABLE 2-continued

Hygroscopicity of 99.5%-purity Glycerine at 50% Relative Humidity

| | Percentage Weight Increase | |
|---|---|---|
| Hour | @ 70° F. (21° C.) | @ 77° F. (25° C.) |
| 40 | 10 | 8 |
| 50 | 12 | 8 |
| 75 | 13 | 10 |
| 100 | 14 | 11 |
| 150 | 17 | 13 |
| 200 | 17 | 14 |

The preferred hygroscopic agents have the following characteristics: 1) water soluble, 2) liquid between temperatures of 30° F. (−1° C.) and 150° F. (66° C.), 3) low in vapor pressure, 4) high flash point, 5) low evaporation rate, 6) low toxicity, 7) commercially available at reasonable cost, 8) non-corrosive, and 9) stable at the Ph of the coating.

FIGS. 1–4 illustrate a method of painting in accordance with the present invention. FIG. 1 illustrates a window 10 having glass panes 12 and window trim or frame 14. FIG. 1 depicts the state of window 10 prior to beginning a painting operation. In other words, glass panes 12 are relatively free of paint and other foreign substances, and frame 14 is in need of painting.

FIG. 2 shows window 10 after application of a DAC coating 16, prepared in accordance with above-discussed teaching of the present invention. DAC coating 16 may be brushed, wiped, rolled, or sprayed on the work surfaces to be treated. In the case of brushing, DAC coating 16 may be applied directly to trim 14 with the excess spilling over onto glass 12 as shown in FIG. 2. Preferably, this excess is of sufficient width to serve as a paint mask for glass 12 as trim 14 is being painted.

A second version (not shown) involves applying coating 16 on glass 12 at the juncture between the wood 14 (or other non-glass material) and glass 12, in order to mask or protect glass 12 near window trim 14. In this method, naturally some of DAC coating 16 will ride up onto window frame 14 as it is being applied to glass 12, especially if it is being applied quickly, which is desirable, and by an unskilled hand.

A third version (not shown) of applying DAC coating 16 is preferably utilized when spray painting or other types of wide-spread splatter are anticipated. In the third version, DAC coating 16 is applied over the entire exposed surface of glass 12.

Because of the differential adhesion properties, coating 16 will adhere well to window frame 14, the same as ordinary paint will, while at the same time adhering in a dramatically different way to glass 12 by selectively adhering to glass 12. Coating 16 adheres firmly to glass 12, exhibiting at the same time low tensile adhesion, or low resistance to tensile forces, much as a removable sticky label adheres to any surface.

Once DAC coating 16 is applied and covers a suitably wide strip of glass 12 adjacent window trim 14, and once it sets up or otherwise becomes coatable, normally within three hours after application, the painting operation on trim 14 can begin. FIG. 3 shows window 10 after a paint 18 or other covering composition is applied. As a surface to be painted, DAC coating 16 readily accepts both alkyd and latex paints. Painting can commence without regard to keeping paint 18 off glass 12, since any paint 18 that may ride over onto glass 12 will ride onto coating 16.

Referring to FIGS. 4–5, after painting is complete and paint 18 is dry, DAC coating 16 on glass 12 may be lifted off in an essentially continuous strip or sheet, together with any overlay of paint 18 thereon. For the purposes of the present invention, lifting is defined as a sheet-like removal either by peeling or by scraping, as opposed to and distinguished from chipping, in which the material is removed in flakes or granules. If, after the first step of applying DAC coating 16 to glass 12 is initiated, the painting operation is delayed for some reason, the preferred embodiment of DAC coating 16 may be left on glass 12 for a reasonably long time. Coating 16 may be left on glass 12 for about a month under outdoor conditions and up to four months under indoor conditions before it becomes necessary to paint trim 14 and remove DAC coating 16.

It is preferable, but optional, to cut, scratch, or otherwise scribe a line 20 in DAC coating 16 along the juncture or edge of trim 14 and glass 12 with a knife 22, razor blade, or the like (see FIG. 4) prior to lifting coating 16 away from glass 12. Scribe line 20 insures that coating 16 may be separated from itself in a controlled manner and at desired locations. If a very sharp object, such as a razor blade, is used to form scribe line 20, blade surface is preferably held at about 30 degrees to the plane of glass 12 for best results. In this way the blade 22 doesn't scratch glass 12 as it might if it were held normal to glass 12. The coating can be lifted off the glass surface by peeling or scraping. Depending on the coating formulation, the coating may break into many pieces during scraping. By scraping is meant the process of removal using a razor blade in which the coating is easily lifted as opposed to being removed by substantial force.

Next, coating 16 is simply lifted away from glass 12. Due to the difference in adhesion between coating 16 and glass 12, on one hand, and between coating 16 and trim 14, on the other hand, coating 16 peels or otherwise lifts easily. The mechanism whereby the product of the present invention exhibits this selective or differential adhesion is believed to be present in the invention between the DAC coating and the type of surface to which it is applied.

In addition, coating 16 has strong cohesive properties, which means that coating 16 tends to stick to itself. When subjected to the sheer stresses that result from peeling, pulling, or scraping coating 16 off glass 12, the cohesive forces of coating 16 are greater than the adhesive forces between coating 16 and glass 12. Consequently, coating 16 separates from glass 12 while cohesively sticking to itself. In other words, in the presence of a shear stress coating 16 tends to separate from glass 12 before it fractures or otherwise separates from itself. Moreover, this strong cohesive property relative to low glass adhesion persists for a couple of months, as discussed above.

On the other hand, once coating 16 dries or otherwise becomes coatable it adheres to non-glass materials, such as frame 14, much more strongly than it adheres to glass 12. The forces applied due to cohesive properties of coating 16 are less than forces applied due to the non-glass adhesive property. Thus, coating 16 tends to separate from itself rather than separate from frame 14.

Scribe line 20 guides this separation. On the other hand, scribe line 20 may be omitted. When omitted, DAC coating 16 is simply lifted off glass 12 once a corner or tab is created. Trim or frame 14 of window 10 then acts as acceptably well in many applications a straight edge for severing DAC coating 16 from its counterpart on trim 14.

After coating 16 has been completely removed from glass 12, the painting job is complete for the purposes of the present invention. Glass 12 is substantially free of paint. At least a portion of trim 14 may be covered with coating 16 and paint 18.

The above-discussed preferred embodiment of the DAC coating is a generally transparent composition. A dye or pigment can be introduced into this DAC coating in order to give it color or opacity if such is desirable. However, a clear coating functions as well as a colored one for the above-discussed glass protection purposes.

In the case of using the DAC coating with new windows, the manufacturer's logo, directions etc. may advantageously be printed on the DAC coating once it is applied to the glass. In this way the coating might bear the glass manufacturer's name or a particular paint company's name, or the name of a manufacturer or service company that might be instrumental in the installation and painting of windows, glass doors and the like. Such indicia as logos, directions, etc. may be applied onto the coating by well known methods, such as silk screen, printing, stamping, etc.; or the same indicia could be affixed to a carrier such as paper or film and the carrier could then be applied to the DAC coating by any suitable method. In some cases the indicia could be cut away from the coating in areas where there would be no possibility of paint coming in contact with that part of the coating. It is conceivable too that the cut-away portions of the coating conforming to the indicia being represented could be filled in with a paint .or other permanent marking that would stay on the glass as a logo or name if such glass were used commercially, as in a store window or office window or the like.

The present invention further contemplates the use of the DAC coating itself as a paint, or painting composition. For use as a paint, a proper pigmentation is applied to the composition in order to render the DAC coating a colored paint composition of whatever color. In one embodiment, the DAC paint is formed by adding about 4% glycerine to ordinary latex paint. Testing has shown that adding about 4% by total weight of glycerol to an ordinary latex paint, such as Benjamin Moore MoorGlo, will produce a differential adhesion paint. Preferably, the percentage of Glycerol to resin is greater than around 10%. Since there is approximately 20% resin in MoorGlo paint, the percent of Glycerol to resin in the MoorGlo paint example is approximately 20%.

One example of ordinary latex paint lists the following ingredients:

| Resin or binders | 234 lbs. | 22% |
| --- | --- | --- |
| Water | 455 lbs. | 44% |
| Pigment | 249 lbs. | 24% |
| Wet edge agent | 75 lbs. | 7% |
| Coalescent | 12 lbs. | 1% |
| Other | 17 lbs. | –2% |

Depending on the paint and other factors, less glycerol will provide an acceptable product for less long periods of time. Also, adding glycerol to paint creates a differential adhesion coating that is not as strong cohesively as the unpigmented differential adhesion coating examples presented above. Further, the percentage of glycerol can be raised to make the differential adhesion effect last longer. Thus, it appears that a very strong and/or long lasting hygroscopic agent is available to create consistent differential adhesion properties. For the purposes of the present invention, consistent differential adhesion indicates that the ease with which the coating may be removed remains relatively stable over a relatively long period of time.

The current use of about 16% propylene glycol and ethylene glycol in paints alone fails to produce an acceptable differential adhesion effect. Generally, the time between applying a first coat of paint and completion of drying of a second or third coat exceeds the duration during which the first coat of paint is liftable from the glass. In other words, a first coat of conventional paint cannot be easily scraped from glass if it is sufficiently dry to support a second coat of paint. Consequently, when multiple coats of conventional paint are applied, the paint cannot be scraped off glass unless each coat of paint is separately removed before applying the next coat, a time consuming and costly job.

However, the DAC paint formed as discussed above is liftable for 30 days or more. The DAC paint is used directly as a paint on window frames and trim materials or on any materials that border a glass or glass-like surface (such as a glazed ceramic or polished or plated metal). When DAC paint is being applied, the above-discussed step of first applying the DAC coating as a glass-protecting coating is unnecessary. Rather, the DAC paint is applied directly as a paint on window frames and the like without regard for getting the DAC paint on the glass. Once the DAC paint sets up on the glass, further coats of paint can be added. After the painting job is complete, the portions on the glass would be removed from the glass as previously described.

The pigmented DAC paint coating, described above, may also be used as a primer or first coat. Hence, another kind of finishing paint that is perhaps more suitable to the user's needs at the time may be used over the DAC paint. Once the primer DAC paint is applied, according to the steps above described, further coats of a different paint (perhaps a different color) can be applied over the primer on the non-glass surface to be treated. The adjacent glass, then, would be protected because of the initial coat of DAC paint primer thereon, which ultimately would be lifted off the glass together with the subsequent coats of paint thereon.

In summary, the present invention provides a coating composition having differential adhesion properties when applied in a single operation to window glass without regard to covering adjacent trim material which is to be painted. The DAC (differential adhesion composition) coating is characterized by high adhesion to wood, painted surfaces and certain metals and plastics and at the same time by a low or selective adhesion to glass and glass-like surfaces, so that the DAC coating may be lifted off from the glass once the coating sets up or otherwise becomes coatable (about three hours after application) together with any paint overlay thereon after a subsequent painting operation of the window frame is completed. As a surface to be treated with paint, the coating will adhere to other paints, for example alkyd and latex paints. In order to remove the DAC coating, it is only necessary to lift an edge of the coating from the glass, as by a razor blade or other suitable tool, to provide a gripping area so that the coating can be removed from the glass in a continuous manner, similar to removing a stick-on label. The particular adhesive quality on glass and glass-like surfaces of the DAC coating according to the invention is characterized by a low resistance to tensile forces, so that the DAC coating sticks to the glass surface once it is applied (either by brush, roller or spraying) but can be easily lifted away from that surface after curing or setting-up. The DAC coating is extremely cohesive causing it to remain in a continuous strip or sheet rather than fracturing when subjected to sheer forces inherent in pulling or lifting the coating off the glass. The DAC coating can be left on the glass surface for a reasonably long time—about 1–2 months under outdoor conditions and up to four months under indoor conditions—before it becomes necessary to paint the trim.

The present invention has been described above with reference to a preferred embodiment. However, those skilled in the art will recognize that changes and modifications may be made in this preferred embodiment without departing from the scope of the present invention. Changes and modifications which are obvious to those skilled in the art are intended to be included within the scope of the present invention.

INDUSTRIAL APPLICABILITY

The present invention may be exploited by makers of coating compositions, masking products, paints, primers, and the like. The method of the present invention can be exploited by painting contractors, homeowners, hobbyists, or anyone needing to paint non-glass materials adjacent to glass-like surfaces rapidly and inexpensively. The method for adding indicia to a glass-like surface could be exploited by makers of glass or paint or by any other business or individual with an interest in displaying advertising or instructions on glass.

I claim:

1. A method for painting a non-glass material which resides adjacent a glass surface, comprising the steps of:

applying a liquid coating composition to said glass surface proximate said non-glass material and at least a portion of said non-glass material, said coating composition when dried having a high enough adhesion to said non-glass material to be a permanent coating thereon and a low enough adhesion to said glass surface to be removed therefrom.

allowing said liquid coating composition to dry to produce a dried coating composition, painting at least the non-glass material including portions having the dried coating composition thereon, and lifting and removing said dried coating composition away from said glass surface.

2. A painting method as claimed in claim 1 wherein said applying step applies said liquid coating composition for a sufficient width on said glass surface to serve as a mask over said glass surface.

3. A painting method as claimed in claim 1 wherein an edge exists between said non-glass material and said glass surface and said lifting step comprises the step of separating said dried coating composition from itself proximate said edge so that said dried coating composition remains applied to said portion of said non-glass material.

4. A painting method as claimed in claim 1 wherein an edge exists between said non-glass material and said glass surface and said method additionally comprises the step of cutting a line on said dried coating composition proximate said edge prior to said lifting step to guide the separation of the dried coating from itself.

5. A painting method as claimed in claim 1 additionally comprising the step of waiting at least one day between said allowing and lifting steps.

6. A painting method as claimed in claim 1 wherein said lifting step occurs at any time after said allowing step.

7. A painting method as claimed in claim 1 wherein said lifting step is accomplished by scraping said dried coating composition off of said glass surface.

8. A painting method as claimed in claim 1 wherein said lifting step exerts a tensile stress on said dried coating composition and said method additionally comprises the step of formulating said liquid coating composition so that, after said allowing step, cohesive forces of said dried coating composition that resist said tensile stress are greater than adhesive forces between said dried coating composition and said glass surface.

9. A painting method as claimed in claim 8 wherein said formulating step causes cohesive forces of said dried coating composition that resist said tensile stress to be less than adhesive forces between said dried coating composition and said non-glass material.

10. A painting method as claimed in claim 1 wherein said painting step comprises the step of applying a paint so that said paint overlies said dried coating composition on said glass surface and said non-glass material.

* * * * *